United States Patent
Saito et al.

(10) Patent No.: US 6,521,693 B2
(45) Date of Patent: Feb. 18, 2003

(54) LONG FIBER-REINFORCED POLYPROPYLENE RESIN COMPOSITION AND MOLDED ARTICLE

(75) Inventors: Koichi Saito, Chiba (JP); Toshimori Nakai, Chiba (JP); Nobukazu Atsumi, Chiba (JP); Hitoshi Kuramochi, Chiba (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 66 days.

(21) Appl. No.: 09/794,127

(22) Filed: Feb. 28, 2001

(65) Prior Publication Data

US 2001/0025074 A1 Sep. 27, 2001

(30) Foreign Application Priority Data

Mar. 1, 2000 (JP) ........................ 2000-055361
Nov. 1, 2000 (JP) ........................ 2000-334530

(51) Int. Cl.$^7$ .............................. C08K 3/40; C08L 51/06
(52) U.S. Cl. ................... 524/494; 524/493; 524/504; 524/847; 523/217
(58) Field of Search ................ 524/494, 493, 524/847, 504; 523/217

(56) References Cited

U.S. PATENT DOCUMENTS

| | | | |
|---|---|---|---|
| 4,694,031 A | | 9/1987 | Morita et al. |
| 5,750,616 A | | 5/1998 | Shimpuku et al. |
| 5,876,827 A | | 3/1999 | Fink et al. |
| 6,268,062 B1 | * | 7/2001 | DeMeuse .................. 428/461 |
| 6,284,831 B1 | * | 9/2001 | Shimpuku et al. .......... 524/494 |
| 6,323,298 B1 | * | 11/2001 | Yanagihara et al. ........ 526/351 |

FOREIGN PATENT DOCUMENTS

| | | |
|---|---|---|
| EP | 0652138 | 5/1995 |
| EP | 1027973 | 8/2000 |
| WO | 99/20446 | 4/1999 |

OTHER PUBLICATIONS

Patent Abstracts of Japan for JP 05–239286 published Sep. 17, 1993.

* cited by examiner

*Primary Examiner*—Tae H. Yoon
(74) *Attorney, Agent, or Firm*—Wenderoth, Lind & Ponack, L.L.P.

(57) ABSTRACT

Provided is a long fiber-reinforced polypropylene resin composition which provides a molded article excellent in a mechanical strength and an impact resistance and having a small anisotropy in a strength, so that it can suitably be used even for uses in medium-sized to large-sized molded articles. The long fiber-reinforced polypropylene resin composition comprises 40 to 85% by weight of (A) a long fiber-reinforced propylene homopolymer pellet shown below and 15 to 60% by weight of (B) a propylene base block copolymer resin having the MFR of 50 g/10 min or less:

(A): a long fiber-reinforced propylene homopolymer pellet comprising, (A1): 20 to 64.9% by weight of a modified propylene homopolymer obtained by modifying a propylene homopolymer with unsaturated carboxylic acid or an anhydride thereof or a mixture of the above modified propylene homopolymer and an unmodified propylene homopolymer, wherein an MFR is 60 g/10 min or more, (A2): 0.1 to 5% by weight of at least one selected from the group consisting of simple substances, hydroxides and oxides of alkaline earth metals, and (A3): 35 to 75% by weight of glass long fiber having a length of 2 to 50 mm.

10 Claims, No Drawings

LONG FIBER-REINFORCED POLYPROPYLENE RESIN COMPOSITION AND MOLDED ARTICLE

TECHNICAL FIELD

The present invention relates to a long fiber-reinforced polypropylene resin composition which is suited for producing not only small-sized molded articles but also wide-ranged molded articles from medium-sized ones to large-sized ones and to a molded article obtained from the same. Specifically, it relates to a molded article which is excellent in a mechanical strength obtained particularly when it is molded into a medium-sized to large-sized molded article, particularly a mechanical strength in a direction perpendicular to a flow direction of the resin, and therefore has a small anisotropy in a mechanical strength and which is excellent as well in an impact strength and to a long fiber-reinforced polypropylene resin composition which provides the same.

BACKGROUND ART

A so-called long fiber-reinforced polypropylene resin composition obtained by impregnating a reinforcing continuous fiber bundle with a molten polypropylene resin and then pultruding it to pelletize to a length of 2 to 50 mm provides a molded article which is excellent in a mechanical strength, an impact resistance and a heat resistance and therefore is widely used for uses in car parts, industrial parts and the like.

However, when molding a long fiber-reinforced polypropylene resin composition into medium-sized to large-sized molded articles, the mechanical strength and the impact resistance are still unsatisfactory, and particularly the mechanical strength in a direction perpendicular to a flow direction of the resin is short. Accordingly, the molded articles have a large anisotropy in a strength, and it is the existing state that the uses thereof are restricted.

A composition obtained by impregnating a reinforced fiber bundle with a modified polyolefin blended with an alkaline earth metal compound and then pelletizing it was filed in International Publication WO99/20446 by the present applicants as a long fiber-reinforced polyolefin resin composition providing a molded article which was improved in a mechanical strength. When this composition is molded into small-sized molded articles, the molded articles are improved in a mechanical strength and an impact resistance as compared with those of articles molded from conventional long fiber-reinforced polyolefin resin compositions.

Proposed as a glass fiber-reinforced polyolefin resin composition which is improved in a dispersibility of glass fibers in production and which is less liable to cause breaking of the glass fibers in molding is a glass fiber-reinforced polyolefin resin composition obtained by mixing 10 to 70 parts by weight of pellets which are prepared by blending 100 parts by weight of a mixture comprising 20 to 60% by weight of (A') a propylene homopolymer and 80 to 40% by weight of glass fibers with 1 to 10 parts by weight of an acid-modified polyolefin having an acid-added amount of 0.1 to 10% by weight and in which a pellet length is 2 to 20 mm and the above glass fiber has substantially the same length as the pellet length with (B) 90 to 30 parts by weight of a propylene-ethylene block copolymer so that the whole amount becomes 100 parts by weight (Japanese Patent Application Laid-Open No. 239286/1993, Japanese Patent Application Laid-Open No. 173329/1995 and Japanese Patent Application Laid-Open No. 237512/1995). When these compositions are molded into small-sized molded articles, the molded articles are improved in a mechanical strength, a durability and an impact resistance as compared with those of articles molded from conventional long fiber-reinforced polyolefin resin compositions.

However, not yet known is a long fiber-reinforced polypropylene resin composition providing a molded article which is excellent in a mechanical strength and an impact resistance even when it is molded into medium-sized to large-sized molded articles and which is improved particularly in a mechanical strength in a direction perpendicular to a flow direction of the resin and therefore has a small anisotropy in a strength. Thus, such composition has been demanded.

DISCLOSURE OF THE INVENTION

An object of the present invention is to provide a long fiber-reinforced polypropylene resin composition which can solve entirely the inconveniences described above, that is, an anisotropy in a mechanical strength, an impact resistance and a strength even when it is molded into medium-sized to large-sized molded articles and which can suitably be used as well for uses in medium-sized to large-sized molded articles. Another object is to provide a molded article obtained from the same.

Intensive investigations repeated by the present inventors in order to obtain a long fiber-reinforced polypropylene resin composition which can solve entirely the inconveniences described above have resulted in finding that very useful for solving the problems described above is a composition obtained by blending a long fiber-reinforced pellet comprising as a base, a specific modified propylene homopolymer compounded with an alkaline earth metal compound with a specific propylene base block copolymer resin as a diluent, and thus they have completed the present invention.

That is, the present invention comprises structures shown below.

(1) A long fiber-reinforced polypropylene resin composition comprising 40 to 85% by weight of (A) a long fiber-reinforced propylene homopolymer pellet shown below and 15 to 60% by weight of (B) a propylene base block copolymer resin having a melt flow rate (230° C., 21.18 N; hereinafter abbreviated as MFR) of 50 g/10 min or less:

(A): a long fiber-reinforced propylene homopolymer pellet comprising, (A1): 20 to 64.9% by weight of a modified propylene homopolymer obtained by modifying a propylene homopolymer with unsaturated carboxylic acid or an anhydride thereof or a mixture of the above modified propylene homopolymer and an unmodified propylene homopolymer, wherein the MFR is 60 g/10 min or more, (A2): 0.1 to 5% by weight of at least one selected from the group consisting of simple substances, hydroxides and oxides of alkaline earth metals, and (A3): 35 to 75% by weight of glass long fibers having a length of 2 to 50 mm.

(2) The long fiber-reinforced polypropylene resin composition as described in the above item (1), wherein (A1) the modified propylene homopolymer obtained by modifying the propylene homopolymer with the unsaturated carboxylic acid or the anhydride thereof or the mixture of the above modified propylene homopolymer and the unmodified propylene homopolymer has an MFR of 100 g/10 min or more, and (B) the propylene base block copolymer resin has an MFR of 35 g/10 min or less.

(3) The long fiber-reinforced polypropylene resin composition as described in the above item (1) or (2), wherein (B) the propylene base block copolymer is a high rigid propylene-ethylene block copolymer resin comprising a propylene homopolymer part having an isotactic pentad rate of 0.96 or more and an Mw/Mn (Q value) of 6 or less, and a propylene-ethylene copolymer part.

(4) The long fiber-reinforced polypropylene resin composition as described in any of the above items (1) to (3), wherein
(B) the propylene base block copolymer resin contains 0.0001 to 1% by weight of a nucleating agent based on the propylene base block copolymer resin.

(5) A molded article obtained by molding the long fiber-reinforced polypropylene resin composition as described in any of the above items (1) to (4).

(6) The molded article as described in the above item (5), wherein the glass long fibers contained in the molded article originating in the long fiber-reinforced propylene homopolymer pellet have a residual average fiber length of 1 mm or more.

EMBODIMENT OF THE INVENTION

Any of publicly known processes can be employed as a production process for the propylene homopolymer of (A1) described above constituting (A) the long fiber-reinforced polypropylene homopolymer pellet of the present invention, which is modified with unsaturated carboxylic acid or an anhydride thereof, a so-called modified propylene homopolymer. The modified propylene homopolymer can be obtained, for example, by a process in which a propylene homopolymer is molten and kneaded together with 0.1 to 5 parts by weight of unsaturated carboxylic acid or an anhydride thereof and 0.01 to 0.5 part by weight of an organic peroxide per 100 parts by weight of the above polymer. In the present invention, however, the modified propylene homopolymer has preferably an MFR of 60 g/min or more, more preferably 100 g/min or more and further more preferably 100 to 1,000 g/min from a viewpoint of an effect for improving a mechanical strength and an impact resistance.

Included in (A1) of the present invention is a mixture of the modified propylene homopolymer described above and an unmodified propylene homopolymer. In this case, the mixture has preferably an MFR of 60 g/min or more, more preferably 100 g/min or more and further more preferably 100 to 1,000 g/min.

The unsaturated carboxylic acid or anhydride thereof described above includes acrylic acid, methacrylic acid, maleic acid, nadic acid, fumaric acid, itaconic acid, maleic anhydride, nadic anhydride and itaconic anhydride, and maleic anhydride is preferred from a viewpoint of a glass fiber-reinforcing effect.

To be specific, magnesium hydroxide, calcium hydroxide and magnesium oxide are given as examples of the simple substances, hydroxides and oxides of alkaline earth metals of (A2) described above constituting (A) the long fiber-reinforced polypropylene homopolymer pellet of the present invention. They can be used alone or in combination of two or more kinds thereof. Magnesium hydroxide is preferably used from a viewpoint of an effect for improving the mechanical strength and the impact resistance.

A continuous glass fiber bundle is used as a raw material for the glass long fiber of (A3) described above having a length of 2 to 50 mm constituting (A) the long fiber-reinforced polypropylene homopolymer pellet of the present invention, and this is commercially available as glass roving. Usually, it has an average fiber diameter of 4 to 30 $\mu$m, a filament concentrating number of 400 to 10,000 filaments and a tex yarn number count of 300 to 20,000 g/km, and it has preferably an average fiber diameter of 9 to 23 $\mu$m and a concentrating number of 1,000 to 6,000 filaments. From a viewpoint of a reinforcing effect, it is preferably subjected on a surface thereof to silane coupling agent treatment for the sake of providing the resin with a surface adhesive property.

The blending proportions of (A1) to (A3) are (A1) 20 to 64.9% by weight, (A2) 0.1 to 5% by weight and (A3) 35 to 75% by weight based on (A), that is, the pellet.

Any of processes publicly known as a pultruding process can be employed as a production process for the long fiber-reinforced propylene homopolymer pellet of (A). Usually, employed is a process in which a molten resin comprising (A1) and (A2) is fed from an extruding machine into an impregnating dice provided at a tip of the extruding machine and, the continuous glass fiber bundle which is a raw material of (A3) is passed therethrough to impregnate the above glass fiber bundle with the molten resin and in which it is then pultruded through a nozzle and pelletized into a length of 2 to 50 mm.

Capable of being taken as a method for feeding (A1) and (A2) are:
1) a method in which the modified propylene homopolymer and the alkaline earth metal compound (at least one selected from the group consisting of simple substances, hydroxides and oxides) are dry-blended and put into a hopper of an extruding machine to feed them,
2) a method in which the modified propylene homopolymer, the unmodified propylene homopolymer and the alkaline earth metal compound (at least one selected from the group consisting of simple substances, hydroxides and oxides) are dry-blended and put into a hopper of an extruding machine to feed them,
3) a method in which the propylene homopolymer, the unsaturated carboxylic acid or anhydride thereof, the organic peroxide and the alkaline earth metal compound (at least one selected from the group consisting of simple substances, hydroxides and oxides) are dry-blended and put into a hopper of an extruding machine to feed them while carrying out modification at the same time, and
4) a method in which an extruding machine having at least two raw material-feeding ports is used and while putting thereinto a dry-blended mixture of the propylene homopolymer, the unsaturated carboxylic acid or anhydride thereof and the organic peroxide from the first feeding port to carry out modification, the alkaline earth metal compound (at least one selected from the group consisting of simple substances, hydroxides and oxides) is put thereinto from the second feeding port to feed them. The methods 1), 2) and 4) are preferred from a viewpoint of an effect for improving the mechanical strength and the impact resistance.

Any-of publicly known methods can be employed as the impregnating method as long as they are methods in which a good impregnating property is achieved. Capable of being employed is any of a method in which a glass fiber bundle is brought into contact with a surface of a spreader and passed thereon while applying tension to thereby impregnate it with a molten resin (Japanese Patent Publication No. 37694/1988) and a method in which a glass fiber bundle is passed between a pair of opening pins provided in an impregnating dice in a non-contact state to thereby impregnate it with a molten resin (International Publication WO97/19805). The latter is a preferred method from a viewpoint of providing less problem on fluffing of a glass fiber bundle after passing nozzle at a high speed.

Used as the diluent of (B) is a crystalline propylene base block copolymer resin of propylene with other α-olefins such as ethylene, 1-butene and 1-pentene having a propylene content of 70% by weight or more. The form of the propylene base block copolymer resin may be pelletal, granular, flaky or powdery and shall not specifically be restricted, and the pelletal one is preferably used. The propylene base block copolymer resin has an MFR of 50 g/min or less, preferably 35 g/min or less and more preferably 5 to 35 g/min from a viewpoint of an effect for improving a mechanical strength and an impact resistance.

Similarly from a viewpoint of an effect for improving a mechanical strength and an impact resistance, preferably used as (B) is a high rigid propylene-ethylene block copolymer resin comprising a propylene homopolymer part having an isotactic pentad rate of 0.96 or more and a weight average molecular weight/number average molecular weight (Mw/Mn; so-called Q value) of 6 or less, and a propylene-ethylene block copolymer part. In this case, the isotactic pentad rate shows an isotactic rate in terms of a pentad unit in a molecular chain and can be determined based on Macromolecules 8, 687 (1975) using $^{13}$C-NMR. Further the respective average molecular weights of Mw and Mn can be determined by means of GPC (gel permeation chromatography).

Similarly from a viewpoint of an effect for improving a mechanical strength and an impact resistance, preferably used as (B) is a propylene base block copolymer resin containing 0.0001 to 1% by weight of a nucleating agent based on the propylene base block copolymer resin. In this case, capable of being given as examples of the nucleating agent contained in the propylene base block copolymer resin are talc, succinic acid, lithium benzoate, sodium benzoate, aluminum hydroxy-bis(4-t-butylbenzoate), 1•3,2•4-dibenzylidenesorbitol, 1•3,2•4-bis(p-methylbenzylidene)sorbitol, 1•3,2•4-bis(p-ethylbenzylidene)sorbitol, 1•3,2•4-bis(2',4'-dimethylbenzylidene)sorbitol, 1•3,2•4-bis(3',4'-dimethylbenzylidene)sorbitol, 1•3-p-chloro-benzylidene-2•4-p-methylbenzylidenesorbitol, sodium-bis(4-t-butylphenyl)phosphate, sodium-2,2'-methylene-bis(4,6-di-t-butylphenyl)phosphate, a mixture (1:1:1 weight ratio)) comprising three components of aluminum dihydroxy-2,2'-methylene-bis(4,6-di-t-butylphenyl)phosphate, aluminum hydroxy-bis[2,2'-methylene-bis(4,6-di-t-butylphenyl)-phosphate] and lithium stearate, poly-3-methyl-1-butene, polyvinyl-cyclohexane, polyallyltrimethyl-silane and N,N'-dicyclohexyl-2,6-naphthalenedicarboxyamide.

(A) can be blended with (B) by a dry blending system. It is rather preferred that they are fed directly into a molding machine such as an injection-molding machine after dry-blending without passing through an extruding machine in order to maintain a length of the fibers contained in the composition and obtain a higher effect for improving a mechanical strength and an impact resistance. The blending proportion thereof is determined depending on a glass fiber content in the long fiber-reinforced polypropylene homopolymer pellet of (A) and a glass fiber content required to the finished molded article, and it is (A) 40 to 85% by weight and (B) 15 to 60% by weight from a viewpoint of an effect for improving the mechanical strength and the impact resistance.

In addition to those described above, an antioxidant, a light stabilizer, a UV absorber and an antistatic agent can be added, if necessary, to the composition of the present invention.

Publicly known molding methods such as an injection-molding method, an extrusion-molding method, a blow-molding method, a compression-molding method and an injection compression-molding method can be applied to a production method for a molding article obtained from the long fiber-reinforced polypropylene resin composition without any restrictions. In particular, an injection-molding method, a compression-molding method and an injection compression-molding method are preferred. The resulting molded article can widely be used in various uses from small-sized to large-sized ones. In particular, it can be used in uses for medium-sized to large-sized molded articles for automobiles.

EXAMPLES

The present invention shall more specifically be explained below with reference to examples and comparative examples, but the present invention shall not be restricted by these examples.

Measuring Method of Resin (1) MFR

Measured based on a test condition 14 of JIS-K7210.

(2) Ethylene Content

Measured by an infrared absorption spectrum analytical method (IR method).

(3) Isotactic Pentad Rate

Measured by means of $^{13}$C-NMR based on Macromolecules 8, 687 (1975).

(4) Q value (Mw/Mn)

The sample was dissolved in orthodichlorobenzene of 135° C. to measure the value by means of a GPC (gel permeation chromatograph) apparatus (model 150C, manufactured by Waters Co., Ltd., used column: TSK GEL GMH6-HT).

Evaluation Method of Molded Article (1) Cut-out Tensile Strength

A test piece was prepared by cutting out a JIS No.1 tensile dumbbell in a flow direction of the resin and a direction perpendicular to the flow direction by means of a milling machine to measure a tensile strength based on JIS K-7113.

(2) Impact Resistance

A puncture impact test based on ASTM D3763 was carried out. A plate of 50 mm×50 mm was cut out from the molded article to determine a maximum load value and a breaking energy value by means of a Dynatap impact tester manufactured by General Research Co., Ltd.

(3) Residual Average Fiber Length (volume average fiber length of glass long fibers originating in the long fiber-reinforced propylene homopolymer pellet contained in the molded article A test piece of 50 mm×50 mm cut out from the molded article was left standing in an electric furnace set at an ambient temperature of 600° C. for 2 hours to remove a resin part by burning, whereby a residue was obtained. The glass fiber was sampled by a method in which the resulting residue was sufficiently stirred in water and then a part thereof was taken on a Petri dish to measure a fiber length. Two thousand glass fibers were measured for a length. The measured values were used to calculate a volume average fiber length value (Lv) from the following equation to obtain an average fiber length:

$$Lv = [\Sigma Li \cdot Vi]/\Sigma Li$$

$$= [\Sigma Li \cdot \pi(D/2)^2 Li \cdot ni]/[\Sigma \pi(D/2)^2 Li \cdot ni]$$

$$= [\Sigma Li^2 \cdot ni]/[\Sigma Li \cdot ni]$$

Li: length of fiber
ni: number of fibers having a length of Li

Vi: volume of fibers having a length of Li
D: diameter of fiber

Example 1

The following materials were prepared.
GPP-1: production method for a long fiber-reinforced propylene homopolymer pellet 1

A glass roving having an average fiber diameter of 17 μm and a tex yarn number count of 2310 g/km was introduced into an impregnating bath heated at 280° C. On the other hand, fed into the above impregnating bath was a molten mixture of a modified propylene homopolymer [modified with maleic anhydride, crystal melting point (measured by DSC): 160° C., MFR: 130 g/10 min] and magnesium hydroxide (blended so that it accounted for 2.0% by weight in the pellet). The glass roving was impregnated with the polypropylene resin and then pultruded through a round nozzle having a diameter of 2.0 mm. It was cooled down and then cut to a length of 10 mm to obtain a long fiber-reinforced propylene homopolymer pellet having a glass fiber content of 60% by weight.
BPP-1: propylene base block copolymer resin 1

Used was a propylene-ethylene block copolymer resin pellet of a high rigidity type having an MFR of 30 g/10 min, an ethylene content of 10% by weight, an isotactic pentad rate of 0.98 and a Q value of 5.5.

Both materials were dry-blended in a proportion of 50% by weight of the material GPP-1 and 50% by weight of the material BPP-1 so that the glass fibers accounted for 30% by weight in the final composition, and the blended matter was charged into an injection-molding machine set at a cylinder temperature of 250° C. and molded into a molded article of 300 mm×600 mm×3 mm thickness (center direct gate). A test piece for determining a tensile strength, an impact resistance and an average fiber length was cut out from the resulting plate and used for evaluating a tensile strength, an impact resistance and an average fiber length to find that all were good. The results thereof are shown in Table 1.

Example 2

The following materials were prepared.
GPP-2: a long fiber-reinforced propylene homopolymer pellet 2

A long fiber-reinforced propylene homopolymer pellet having a glass fiber content of 50% by weight was obtained based on the production method for GPP-1, except that the glass roving was pultruded through a round nozzle having a diameter of 2.3 mm.

Both materials were dry-blended in a proportion of 80% by weight of the material GPP-2 and 20% by weight of the material BPP-1 so that the glass fibers accounted for 40% by weight in the final composition, and the blended matter was molded and evaluated in the same manner as in Example 1 to find that the results thereof were good.

Example 3

The following materials were prepared.
GPP-3: a long fiber-reinforced propylene homopolymer pellet 3

A long fiber-reinforced propylene homopolymer pellet having a glass fiber content of 70% by weight was obtained based on the production method for GPP-1, except that the glass roving was pultruded through a round nozzle having a diameter of 1.7 mm.

Both materials were dry-blended in a proportion of 43% by weight of the material GPP-3 and 57% by weight of the material BPP-1 so that the glass fibers accounted for 30% by weight in the final composition, and the blended matter was molded and evaluated in the same manner as in Example 1 to find that the results thereof were good.

Example 4

The following materials were prepared.
BPP-2: propylene base block copolymer resin 2

Used was a propylene-ethylene block copolymer resin pellet of an ordinary type having an MFR of 30 g/10 min, an ethylene content of 7% by weight, an isotactic pentad rate of 0.95 and a Q value of 8.0.

Both materials were dry-blended in a proportion of 50% by weight of the material GPP-1 and 50% by weight of the material BPP-2 so that the glass fibers accounted for 30% by weight in the final composition, and the blended matter was molded and evaluated in the same manner as in Example 1 to find that the results thereof were good.

Example 5

The following materials were prepared.
GPP-4: a long fiber-reinforced propylene homopolymer pellet 4

A long fiber-reinforced propylene homopolymer pellet having a glass fiber content of 60% by weight was obtained based on the production method for GPP-1, except that a modified propylene homopolymer having an MFR of 70 g/10 min was used.
BPP-3: propylene base block copolymer resin 2

Used was a propylene-ethylene block copolymer resin pellet of an ordinary type having an MFR of 45 g/10 min, an ethylene content of 7% by weight, an isotactic pentad rate of 0.95 and a Q value of 8.0.

Both materials were dry-blended in a proportion of 50% by weight of the material GPP-4 and 50% by weight of the material BPP-3 so that the glass fibers accounted for 30% by weight in the final composition, and the blended matter was molded and evaluated in the same manner as in Example 1 to find that the results thereof were good.

Example 6

The following materials were prepared.
BPP-4: propylene base block copolymer resin 4

Used was a propylene-ethylene block copolymer resin pellet of a high rigidity type which contained 0.3% by weight of talc having an average particle diameter of 2 to 3 μm and which had an MFR of 30 g/10 min, an ethylene content of 10% by weight, an isotactic pentad rate of 0.98 and a Q value of 5.5.

Both materials were dry-blended in a proportion of 80% by weight of the material GPP-2 and 20% by weight of the material BPP-4 so that the glass fibers accounted for 40% by weight in the final composition, and the blended matter was molded and evaluated in the same manner as in Example 1 to find that the results thereof were good.

Comparative Example 1

The following materials were prepared.
GPP-5: a long fiber-reinforced propylene homopolymer pellet 5

A long fiber-reinforced propylene homopolymer pellet having a glass fiber content of 30% by weight was obtained based on the production method for GPP-1, except that magnesium hydroxide was not blended and the glass roving was pultruded through a round nozzle having a diameter of 3.3 mm.

The blended matter was molded and evaluated in the same manner as in Example 1, except that only GPP-5 was charged directly into the molding machine to find that neither mechanical strength (in particular, perpendicular direction) nor impact resistance were improved.

Comparative Example 2

The following materials were prepared.
GPP-6: a long fiber-reinforced propylene homopolymer pellet 6

A long fiber-reinforced propylene homopolymer pellet having a glass fiber content of 30% by weight was obtained based on the production method for GPP-1, except that the glass roving was pultruded through a round nozzle having a diameter of 3.3 mm.

The blended matter was molded and evaluated in the same manner as in Example 1, except that only GPP-6 was charged directly into the molding machine to find that neither mechanical strength (in particular, perpendicular direction) nor impact resistance were improved.

Comparative Example 3

The following materials were prepared.
HPP: propylene homopolymer resin
A propylene homopolymer resin pellet having an MFR of 30 g/10 min was used.

Magnesium hydroxide was blended, and the strength in the flow direction was improved to some extent, but the diluent was the homopolymer, so that the strength in a perpendicular direction and the impact resistance were inferior.

Comparative Example 4

The following materials were prepared.
GPP-7: a long fiber-reinforced propylene homopolymer pellet 7

A long fiber-reinforced propylene homopolymer pellet having a glass fiber content of 60% by weight was obtained based on the production method for GPP-1, except that magnesium hydroxide was not blended.

Both materials were dry-blended in a proportion of 50% by weight of the material GPP-7 and 50% by weight of the material BPP-1 so that the glass fibers accounted for 30% by weight in the final composition, and the blended matter was molded and evaluated in the same manner as in Example 1. Magnesium hydroxide was not blended with the long fiber-reinforced pellet, and therefore neither mechanical strength (in particular, perpendicular direction) nor impact resistance were improved.

TABLE 1

| | (A) Long fiber-reinforced pellet material | | | | | (B) Diluent resin pellet | | | |
|---|---|---|---|---|---|---|---|---|---|
| | Kind | Base MFR g/10 min | (A2) component — | GF content wt % | Blending proportion wt % | Kind — | MFR g/10 min | Type — | Blending proportion wt % |
| Example 1 | GPP-1 | 130 | Present | 60 | 50 | BPP-1 | 30 | High rigid | 50 |
| Example 2 | GPP-2 | 130 | Present | 50 | 80 | BPP-1 | 30 | High rigid | 20 |
| Example 3 | GPP-3 | 130 | Present | 70 | 43 | BPP-1 | 30 | High rigid | 57 |
| Example 4 | GPP-1 | 130 | Present | 60 | 50 | BPP-2 | 30 | Normal | 50 |
| Example 5 | GPP-4 | 70 | Present | 60 | 50 | BPP-3 | 45 | Normal | 50 |
| Example 6 | GPP-2 | 130 | Present | 50 | 80 | BPP-4 | 30 | High rigid | 20 |
| Comparative Example 1 | GPP-5 | 130 | None | 30 | 100 | — | — | — | — |
| Comparative Example 2 | GPP-6 | 130 | Present | 30 | 100 | — | — | — | — |
| Comparative Example 3 | GPP-1 | 130 | Present | 60 | 50 | HPP | 30 | Homo | 50 |
| Comparative Example 4 | GPP-7 | 130 | None | 60 | 50 | BPP-1 | 30 | High rigid | 50 |

| | Molded article | | Cut-out tensile strength | | Puncture impact | |
|---|---|---|---|---|---|---|
| | GF content wt % | Residual average fiber length mm | Flow direction MPa | Perpendicular direction MPa | Maximum load kN | Energy J |
| Example 1 | 30 | 2.2 | 79 | 74 | 2.6 | 16 |
| Example 2 | 40 | 1.9 | 92 | 86 | 2.9 | 18 |
| Example 3 | 30 | 2.2 | 77 | 73 | 2.5 | 17 |
| Example 4 | 30 | 2.3 | 72 | 65 | 2.3 | 15 |
| Example 5 | 30 | 2.1 | 70 | 61 | 2.2 | 14 |
| Example 6 | 40 | 1.9 | 93 | 89 | 2.9 | 19 |
| Comparative Example 1 | 30 | 2.3 | 56 | 32 | 1.5 | 11 |
| Comparative Example 2 | 30 | 2.2 | 61 | 33 | 1.7 | 11 |
| Comparative Example 3 | 30 | 2.2 | 63 | 35 | 1.7 | 12 |
| Comparative Example 4 | 30 | 2.2 | 53 | 30 | 1.8 | 12 |

Both materials were dry-blended in a proportion of 50% by weight of the material GPP-1 and 50% by weight of the material HPP so that the glass fibers accounted for 30% by weight in the final composition, and the blended matter was molded and evaluated in the same manner as in Example 1.

EFFECTS OF THE INVENTION

The long fiber-reinforced polypropylene resin composition of the present invention is excellent in a mechanical strength and an impact resistance as well in uses for medium-sized to large-sized molded articles by combining a specific long fiber-reinforced pellet with a specific diluent. In particular, the mechanical strength in a direction perpendicular to a flow direction of the resin is improved, and therefore an anisotropy in a strength of the molded article is small. This makes it possible to widely use the resin composition for various uses from small-sized ones to large-sized ones. In particular, it can suitably be used for uses in medium-sized to large-sized molded articles for automobiles.

What is claimed is:

1. A long fiber-reinforced polypropylene resin composition comprising 40 to 85% by weight of (A) a long fiber-reinforced propylene homopolymer pellet and 15 to 60% by weight of (B) a propylene base block copolymer resin having a melt flow rate 230° C., 21.18 N; hereinafter abbreviated as MFR) of 50 g/10 mm or less, wherein the long fiber-reinforced propylene homopolymer pellet comprises (A1): 20 to 64.9% by weight of a modified propylene homopolymer obtained by modifying a propylene homopolymer with unsaturated carboxylic acid or an anhydride thereof or a mixture of the modified propylene homopolymer and an unmodified propylene homopolymer, wherein the MFR is 60 g/10 mm or more, (A2): 0.1 to 5% by weight of at least one member selected from the group consisting of simple substances, hydroxides and oxides of alkaline earth metals, and (A3): 35 to 75% by weight of long glass fibers having a length of 2 to 50 mm.

2. The long fiber-reinforced polypropylene resin composition as described in claim 1, wherein (A1) the modified propylene homopolymer obtained by modifying the propylene homopolymer with the unsaturated carboxylic acid or the anhydride thereof or the mixture of the modified propylene homopolymer and the unmodified propylene homopolymer has an MFR of 100 g/10 mm or more, and (B) the propylene base block copolymer resin has an MFR of 35 g/10 mm or less.

3. The long fiber-reinforced polypropylene resin composition as described in claim 1, wherein (B) the propylene base block copolymer resin is a high rigid propylene-ethylene block copolymer resin comprising a propylene homopolymer part having an isotactic pentad rate of 0.96 or more and an Mw/Mn (Q value) of 6 or less and a propylene-ethylene copolymer part.

4. The long fiber-reinforced polypropylene resin composition as described in claim 3, wherein (B) the propylene base block copolymer resin contains 0.0001 to 1% by weight of a nucleating agent based on the propylene base block copolymer resin.

5. A molded article obtained by molding the long fiber-reinforced polypropylene resin composition as described in claim 1.

6. The molded article as described in claim 5, wherein the long glass fibers contained in the molded article originating in the long fiber-reinforced propylene homopolymer pellet have a residual average fiber length of 1 mm or more.

7. The long fiber-reinforced polypropylene resin composition as described in claim 2, wherein (B) the propylene base block copolymer resin is a high rigid propylene-ethylene block copolymer resin comprising a propylene homopolymer part having an isotactic pentad rate of 0.96 or more and an Mw/Mn (Q value) of 6 or less, and a propylene-ethylene copolymer part.

8. The long fiber-reinforced polypropylene resin composition as described in claim 7, wherein (B) the propylene base block copolymer resin contains 0.0001 to 1% by weight of a nucleating agent based on the propylene base block copolymer resin.

9. A molded article obtained by molding the long fiber-reinforced polypropylene resin composition as described in claim 2.

10. The molded article as described in claim 9, wherein the long glass fibers contained in the molded article originating in the long fiber-reinforced propylene homopolymer pellet have a residual average fiber length of 1 mm or more.

* * * * *